June 16, 1964

S. CIRAMI 3,137,501

COIN OPERATED ROBOT RIDE

Filed May 9, 1961

INVENTOR.
Salvatore Cirami

United States Patent Office 3,137,501
Patented June 16, 1964

3,137,501
COIN OPERATED ROBOT RIDE
Salvatore Cirami, 75—36 Parsons Blvd.,
Flushing 67, N.Y.
Filed May 9, 1961, Ser. No. 108,786
6 Claims. (Cl. 272—1)

This invention relates to amusement apparatus and more particularly to an amusement ride of the stationary coin operated type used in or in front of retail stores.

The present invention provides an amusement ride in which a passenger compartmented robot is secured to and treads on a stationary platform: to transmit a sensation of walking to its occupant, and to create for the entertainment of onlookers the illusion of a walking robot.

The main object is to provide a coin operated amusement ride in the form of a passenger compartmented robot, that appears to be independent and mobile, and that imparts to its occupant the sensations of walking, yet does not actually move from where it is placed. To accomplish these ends the robot is provided with a pair of motor driven stepping feet, but is secured to a low platform that is designed to prevent travel and toppling, while the platform itself remains relatively inconspicious. The means for securing the robot to the platform provides for a degree of movement of the robot relative to the platform as a result of and in conjunction with the action of the feet; in this way achieving a pleasant displacement of the rider and developing a life-like illusion.

The robot illustrated here employs the stepper disclosed in my original application, Serial Number 768,793, filed October 21, 1958, now Patent 3,085,516, for Robot Amusement Ride.

To improve the efficiency of that stepper when used in restrained operation on a stationary platform, it is another object to provide an inexpensive means for reducing the friction between the feet and the surface on which the feet tread.

Still another object is to provide a specific means for securing the robot to the platform—one that allows the passenger compartment freedom to rise and fall with the lifting and lowering of the feet, and also allows the robot to rock from side to side as a result of the stepping action.

FIG. 1 is a side elevational view of the completed assembly, showing a passenger compartmented robot connected to a platform. In this view, the robot is seen in operation; with the left foot lowered, and the right uplifted, raising the vehicle slightly and causing it to lean backward. Broken lines are used to indicate the bed plate to which the walking mechanism is attached, and to suggest the outline of a child seated in the robot.

Figure 1:
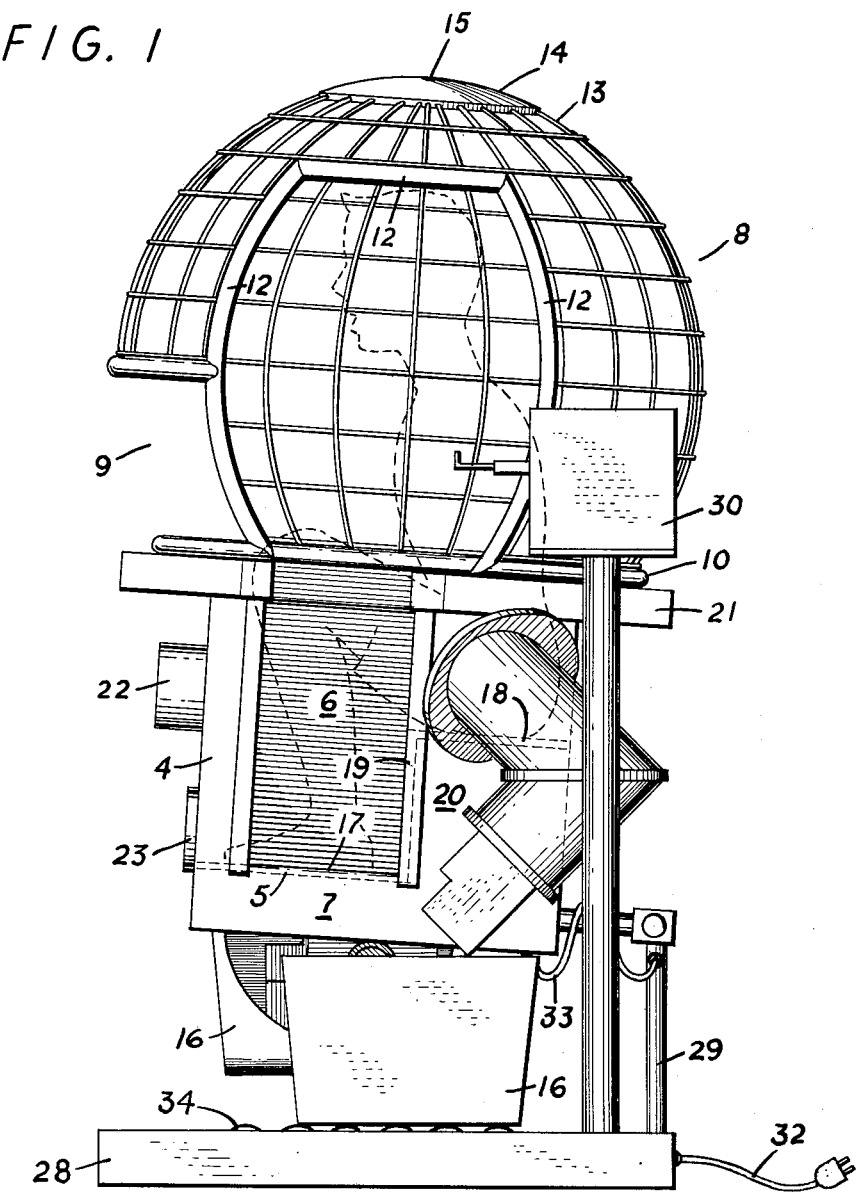

Referring to FIG. 1, the torso of the robot is an open top open bottom body—indicated generally as 4—that is divided by a bed plate 5 (shown in broken lines) into a deep upper passenger compartment 6 and a shallow lower mechanism compartment 7. A wire cage 8 suggests the robot's head, and is formed with an opening 9 which in addition to representing the visor of a space helmet, affords an unobstructed view forward. The cage is reinforced with a frame made of tubing, forming the base of the robot's head at 10, the upper edge of the visor, and outlining the entrance opening at 12. The upright wires 13 of the cage are fixed to a cap 14 having a hole 15. If desired, a flashing dome light may be suspended from the cap; attached by means of a bolt passing through the hole.

Feet 16 depend from the mechanism compartment, in which is contained the elements that actuate the feet. The bed plate 5 is formed to provide in a one-piece structure, a floor 17 and a seat 18; connected together by a panel 19. The phrase "shallow mechanism compartment" refers to the space under the floor. The space 20 under the seat may be considered a motor housing compartment.

The top is shaped, as nearly as possible, in the form of a sphere, so the flattened bottom would naturally be circular. But the torso is square shaped (seen from above). There has to be something to adapt the circle to the square. The shoulder 21 fills this need.

Figure 2:
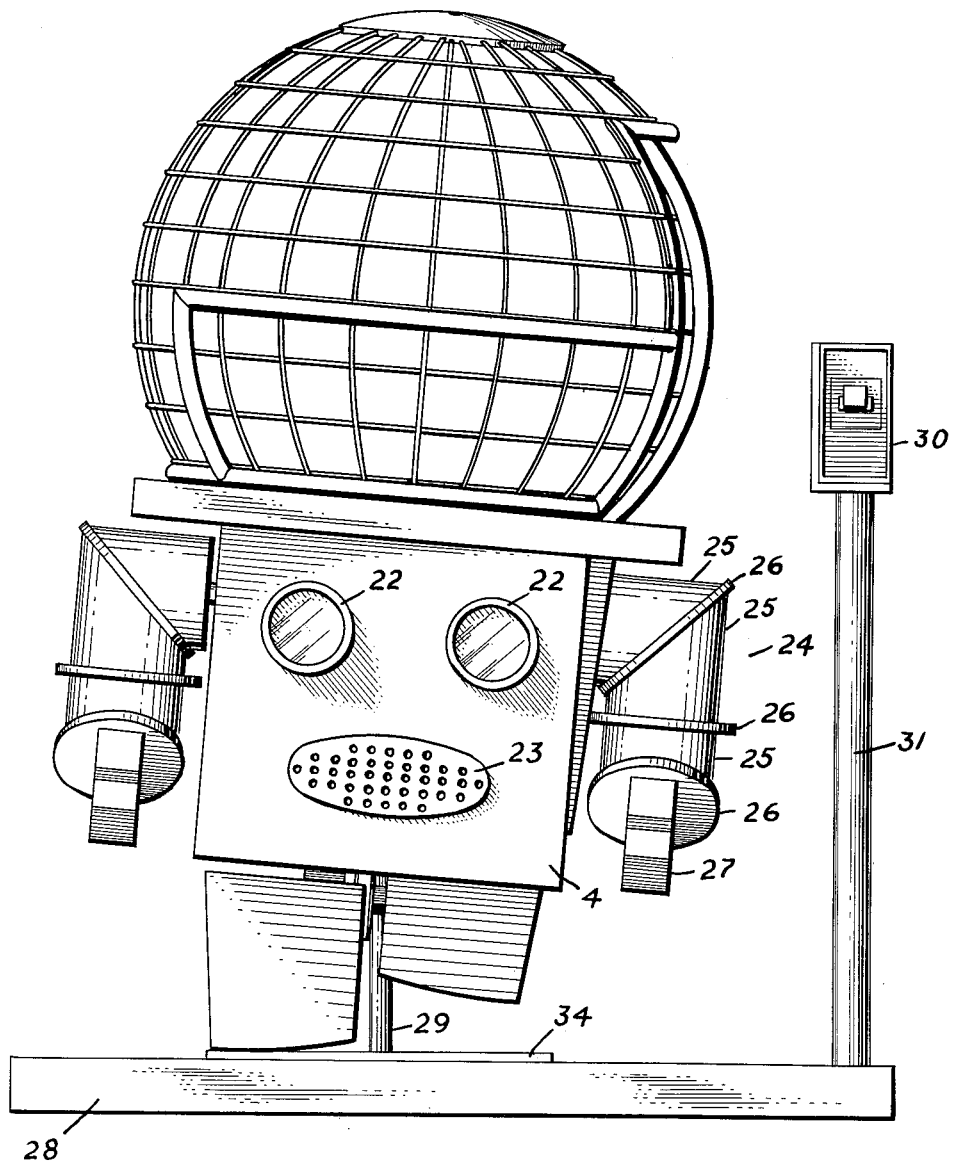
FIG. 2 is a front elevational view of the completed assembly, but in this intsance the right foot is lowered and the left uplifted. This view shows how the robot leans to the side of the uplifted foot.

The robot's eyes are represented by lamps 22, and his mouth by a plate 23 drilled full of holes, FIG. 2. The arms 24, are made of sections of pipe 25 joined to discs 26. Sheet metal is formed into an L-shaped block 27 to represent his hands.

The robot stands on a platform 28; held there by a rigid post 29. A coin unit 30 is wired—down through the post 31, across the platform, and up the post 29—to electrically connect with the outlet cord 32, FIG. 1. The flexible conduit 33 feeds the current to the motor and lamps.

Figure 3:
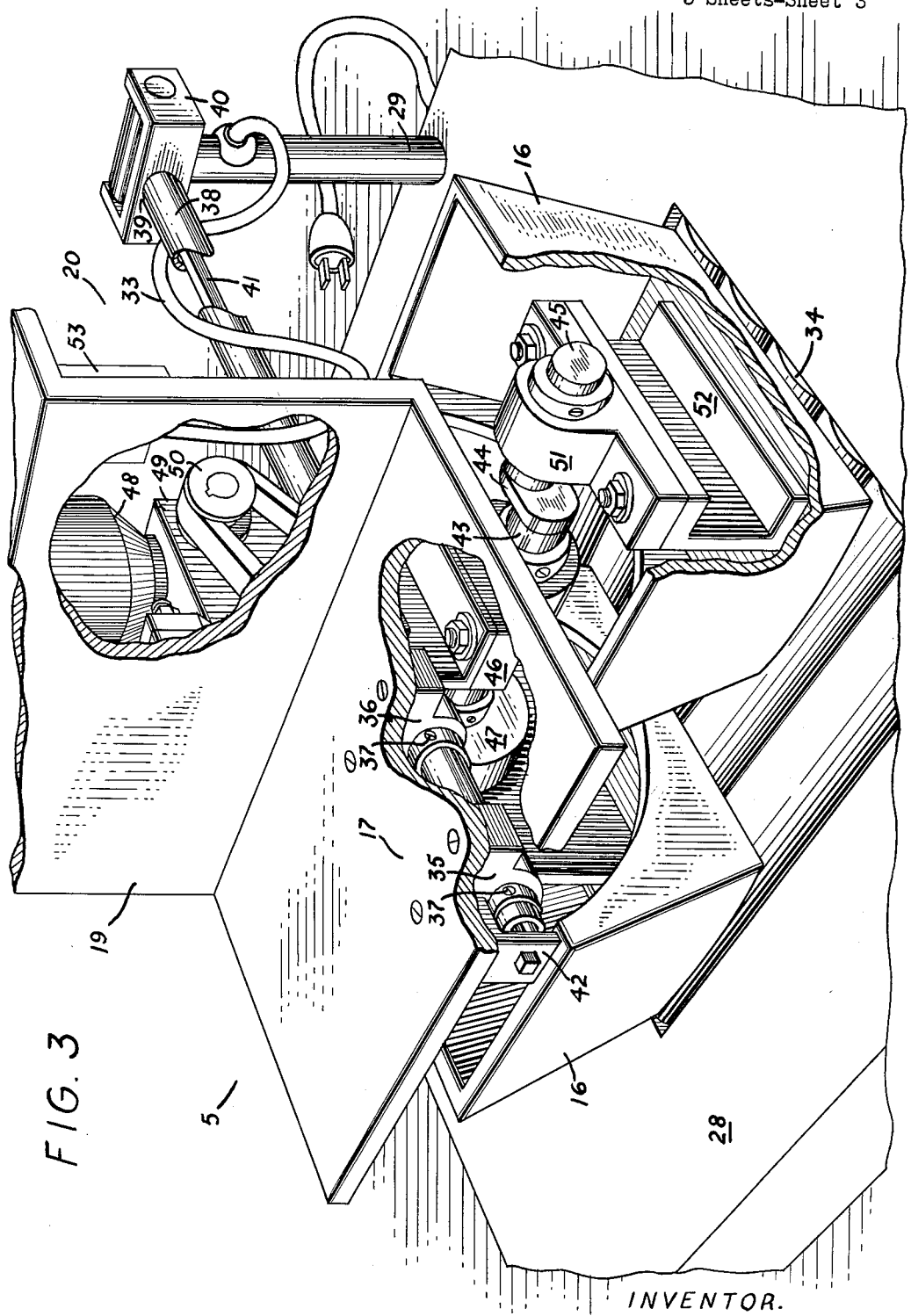
FIG. 3 is a broken part perspective view of the stepping mechanism athat gives the ride its characteristic action. The stepper is attached to the bed plate of the robot's torso and is seen in position on rollers recessed in the platform.

The robot's torso is constructed of sheet metal, permanently attached to the bed plate; but in FIG. 3, the bed plate 5 is shown without the surrounding and enclosing body. The bed plate is shown with the seat at the top broken away, with a portion of the panel 19 broken away so that we can see into the motor housing compartment 20, and with a portion of the floor 17 broken away so that we can see the stepper mechanism.

The feet 16 are standing on rollers 34, and a portion of the left foot is broken away to illustrate the hollow construction and reveal the actuating elements.

The robot's head, arms, eyes and mouth, are attached to the open top open bottom body 4 (the torso); and this body is secured to the bed plate 5. The feet are connected with the operating mechanism and this mechanism depends from and is also secured the bed plate; so the bed plate is the foundation of the assembly. The means for securing the robot to the platform must therefore be attached to the bed plate.

In this embodiment, the bed plate is fitted with depending sway bearings 35 and 36 which are spaced apart along the fore and aft centerline. These bearings are of the type provided with a locking collar that insures a positive drive between the shaft and the inner race of the bearing, so that the shaft is free to rotate in the bearing, but cannot be pulled out of the bearing. However, instead of a shaft, a hollow pipe 38 is passed through the sway bearings. The pipe extends rearwardly of the bed plate (passing through a hole that would be provided in the rear wall of the sheet metal torso) and rigidly connects at 39 with a coupling 40 that is pivotally connected with the post 29. The pivotal relationship is such that the pipe 38 is free to be raised and lowered, but is firmly restricted from movement in any other direction.

Because the sway bearings are locked onto the pipe, the bed plate cannot be pulled off the forward end of the pipe. But of course, since bearings are being used to connect the bed plate with the pipe, the bed plate is free to rock to one side or the other. Were there no further provision, the robot would fall over when a foot were lifted. To allow the robot to rock gently from side to side as the feet are lifted, yet prevent it from falling over; a torsion bar 41 is employed, inserted in the hollow pipe, which is shown cut away near the coupling to reveal the torsion bar. The torsion bar is rigidly fixed to the coupling 40 at the surface where the pipe is joined to the coupling. The other end of the torsion bar extends forward past the end of the pipe, protruding far enough to be inserted into an angle fitting 42.

The angle fitting cannot be rotated relative to the torsion bar, and the fitting is rigidly fixed to the bed plate, so any attempt of the bed plate to fall to one side of the pipe will be restrained by the torsion bar. The degree of rocking is controlled only by the choice of bar used; selecting one that cannot be twisted far enough to allow the robot to sway to an uncomfortable angle—taking into consideration the maximum weight of the loaded robot, when making the selection.

The essential action of the robot is that it transmit a sensation of walking to its occupant, so that a child sitting in the robot will get the feeling that he is in control of "a real robot"; or even imagine that he is himself a robot. To accomplish this object, it will be necessary for the passenger compartment to move in a manner related to the walking movements. The freedom to raise and lower (provided by the coupling), allows the use of a stepper having feet that are alternately lifted and lowered—displacing the passenger compartment accordingly. The sway bearings and torsion bar assembly enhances the illusion by allowing the robot to seemingly shift its weight as it walks. The combined effect is one that is exciting not only to the rider, but to other children as well; who may be standing by, watching and trying to decide whether to ride.

In addition, the eyes may be arranged—in any convenient manner—to blink alternately as the feet step; and if a dome light is installed, it could be arranged to increase in brilliance, timed with the eyes. Flashing "control" lamps—operative only when a safety bar is pulled down—could also be provided inside the torso. This ideal lighting, in combination with the unprecedented walking action, makes for an attraction having maximum drawing power.

To transmit to the passenger the desired sensation of walking, any stepper could be used having feet that are lifted and lowered; but the simplest, lowest cost mechanism still appears to be the single crankshaft stepper disclosed in my original application. The heart of this stepper is a crankshaft supported by two spaced apart bearings. The feet are hung on the oppositely offset ends of the crankshaft, and a motor is connected to slowly rotate the crankshaft. The feet are pivotally connected to the crankshaft and are arranged to hang in balanced dependence therefrom, so that as the crankshaft is rotated, the feet will remain more or less level. In operation, the feet oscillate slightly as the crankshaft slowly lifts, advances, lowers and returns.

Referring still to FIG. 3, only one side of the crankshaft can be seen: the side joined to the left foot. The other side is, of course, similar to the side shown. In this view, the crankshaft is shown holding both feet at the same level, but with the left foot at its maximum rearward position, and the right foot at the maximum forward position.

The crankshaft is comprised of a main shaft 43 having a perpendicular offset 44 at each end and in opposed throw, and a minor shaft such as 45, that is carried by each perpendicular offset. The crankshaft is supported by two main bearings such as 46 which are spaced apart on either side of the pipe 38. Sufficient space is provided between the main bearings to allow installation of a driven pulley 47 that is secured to the main shaft.

A motor 48 operating through a speed reducer 49 and a driver pulley 50, is connected by means of the belt to rotate the driven pulley. By experimenting with the reduction gear ratio and the sizes of the pulleys, a crankshaft speed can be found that will result in the most natural walking effect.

Each foot is provided with a semi-circular cutout in its inboard wall to allow installation of the crankshaft and bearings, and these cutouts are large enough to provide operating clearance between these elements and the feet throughout the stepping cycle.

We come now to a variation between this stepper and the original. In the original, an element equivalent to the bearing 51 was provided fixed to the outboard wall of each foot. The present arrangement is an improvement because this bearing is joined instead to the base of the foot. Since there is no buckling strain placed on the walls of the feet, there is no need to use heavy plate in their construction, and an economy can be effected. In addition, the minor shaft 45 does not extend to the exterior of the foot in this improved version—as it did in the original—making the operating means more mysterious to the casual observer. The bearing 51 is bolted upon a channel shaped piece of structural steel 52, and the foot may be removably attached to the channel by means of screws inserted from underneath.

For maintenance, the robot may be swung up and back—pivoting on the coupling—and the feet removed. This allows accessibility to every element under the floor, as well as in the motor housing compartment; where the electrical terminal board 53 is installed. In here may also be installed flasher units for all lamps, and a noisemaker producing science fiction sounds.

To avoid the abrading action of the feet treading on the platform, it is desirable to provide some means for minimizing friction. The platform could merely be lubricated for this purpose from time to time, but this solution might not be hailed by the shopkeepers who, having the machine on their premises, would have to listen to the clanking of metal against metal, hour after hour.

In the embodiment illustrated, a row of rubber covered rollers 34 is provided, recessed in the platform. Besides quieting the operation, the rollers minimize the resistance against which the motor must work each time it forces a descending foot under and back. A functionally equivalent arrangement would be to provide instead, small rubber covered wheels under each shoe. A considerable saving in cost could be effected, because only four such wheels are needed: two for each foot, placed one in front of the channel and one behind. In this alternative embodiment, the wheels would be carried by axles welded onto the channel, and slots would be provided in the base of the foot to allow the wheels to protrude an inch or so. But using rollers recessed in the platform dramatizes the walking action and precludes the assumption on the part of onlookers that the feet are rolling instead of actually walking.

I claim:

1. In an amusement ride for children:
a stepping robot adapted to the carriage of one or more passengers for their merriment and the entertainment of onlookers, comprising:
a torso in the form of an open top passenger compartment having a floor and provided with walls arranged upright and immediately encircling passengers in such manner as to confine and restrict their movement in said compartment, said walls proportioned reaching no higher than shoulder height of said passengers;
a head in the form of an enclosure attached on top of said compartment, constructed large enough to encompass the head and shoulders of said passengers and so constructed and arranged as to provide visibility for said passengers and ventilation of said compartment;
arms attached on said compartment;
a single pair of foot members, said foot members located depending and spaced apart from the underside of said floor a distance adequate to provide passing clearance between the top of said foot members and the underside of said floor;

means to alternately lift, advance, lower and return said foot members in vertical parallel spaced apart planes, said means located under said floor and fixed to said compartment, and so constructed and arranged as to support the weight of said compartment on said foot members;

a motor connected to drive said means;

the combination so constructed and arranged as to provide a passenger carrying robot having a space inside its head contiguous with a space inside its torso suitable for occupancy by passengers, and so proportioned that said passengers can occupy the space at the conjunction of the head and torso with sufficient freedom to turn about in the act of waving and shouting to onlookers, although the robot is provided with a compact torso and is scaled such that they must occupy both the head and torso simultaneously;

in combination with:

a platform;

a rigid pipe positioned under said floor between said foot members, arranged such that its longitudinal axis parallels the plane in which a foot member is lifted, advanced, lowered and returned, and provided long enough to extend rearwardly of said compartment;

means to secure the forward end of said pipe to the underside of said floor in such arrangement that the compartment cannot move along the longitudinal axis of said pipe but is free to move around its circumference;

a post fixed to said platform at a distance behind said compartment;

said pipe provided pivotally connected to said post in such arrangement that the forward end of the pipe can be lifted and lowered around a horizontal axis that lies perpendicular to the said longitudinal axis of the pipe;

a torsion bar located inside and extending lengthwise of said pipe;

means to prevent rotational movement of said compartment around the longitudinal axis of said torsion bar at its forward end;

means to prevent rotational movement of the rearward end of said torsion bar relative to said pipe;

the combination so constructed and arranged that the lifting and lowering movements of said foot members acting against said platform causes the compartment to vary in elevation above the platform to displace occupants of the compartment for their merriment;

the combination so constructed and arranged that the lifting and lowering of said foot members causes said compartment to move around the circumference of the pipe—thereby imparting a rolling displacement to said compartment, restricted by the increasing resistance offered by the torque produced in the torsion bar, which is provided stiff enough to prevent the compartment from falling on its side when carrying a maximum weight of passengers.

2. Where a rider support is provided spaced above a platform, and suitable means are provided to displace said rider support; means to allow said rider support freedom to lift and lower in combination with means to allow said rider support to lean from side to side in a manner meeting with increasing resistance as the degree of lean increases; comprising:

a rigid pipe positioned under and extending rearwardly of said rider support;

means to secure the forward end of said pipe to the underside of said rider support in such arrangement that the rider support cannot move along the longitudinal axis of said pipe but is free to move around its circumference;

a post fixed to said platform at a distance behind said rider support;

said pipe provided pivotally connected to said post in such arrangement that the forward end of the pipe can be lifted and lowered around a horizontal axis that lies perpendicular to the said longitudinal axis of the pipe;

a torsion bar located inside and extending lengthwise of said pipe;

means to prevent rotational movement of said rider support around the longitudinal axis of said torsion bar at its forward end;

means to prevent rotational movement of the rearward end of said torsion bar relative to said pipe;

the combination so constructed and arranged that said rider support can move around the circumference of the pipe—thereby imparting a rolling displacement to said rider support, restricted by the increasing resistance offered by the torque produced in the torsion bar, which is provided stiff enough to prevent the rider support from falling on its side when carrying a maximum weight of passengers.

3. In a coin operated amusement ride for children:

a rider support;

a pair of foot members depending from the underside of said rider support;

means to alternately lift, advance, lower and return said foot members, said means so constructed and arranged as to support the weight of said rider support on said foot members;

a motor connected to drive said means;

a platform comprising a rigid, transportable structure suitable for stable placement on the ground, having a surface portion suitable for said foot members to tread on, and suitable in construction for support of means next recited;

means, fixed to said platform and connected to said rider support, adapted to secure the rider support to the platform in such arrangement that the foot members stand on said surface portion, and so constructed and arranged that the rider support is prevented from advancing, and from toppling, and is free to be lifted and lowered by the action of said foot members;

the combination so constructed and arranged that said foot members are restricted by said means to treading in-place on said surface portion, and the lifting and lowering movements of the foot members causes the rider support to vary in elevation above said platform in a manner suitable to displace occupants of the rider support for their merriment.

4. In combination with the product of claim 3: said last mentioned means providing said rider support with a limited degree of freedom to lean from side to side as a result of the lifting and lowering of said foot members, sufficient to impart a rolling displacement to said rider support and create the illusion that the rider support is shifting its weight while walking, but not enough to permit the rider support to fall on its side.

5. In a coin operated amusement ride for children:

a stepping robot adapted to the carriage of one or more passengers for their merriment and the entertainment of onlookers, comprising:

a torso in the form of an open top passenger compartment having a floor and provided with walls arranged upright and immediately encircling passengers in such manner as to confine and restrict their movement in said compartment, said walls proportioned reaching no higher than shoulder height of said passengers;

a head in the form of an enclosure attached on top of said compartment, constructed large enough to encompass the head and shoulders of said passengers and so constructed and arranged as to provide visibility for said passengers and ventilation of said compartment;

arms attached on said compartment;

a single pair of foot members, said foot members located depending and spaced apart from the underside of said floor a distance adequate to provide passing clearance between the top of said foot members and the underside of said floor;

means to alternately lift, advance, lower and return said foot members, said means located under said floor and fixed to said compartment, and so constructed and arranged as to support the weight of said compartment on said foot members;

a motor connected to drive said means;

a platform comprising a rigid, transportable structure suitable for stable placement on the ground, having a surface portion suitable for said foot members to tread on, and suitable in construction for support of means next recited;

means, fixed to said platform and connected to said compartment, adapted to secure the compartment to the platform in such arrangement that the foot members stand on said surface portion, and so constructed and arranged that the compartment is prevented from advancing, and from toppling, and is free to be lifted and lowered by the action of said foot members;

the combination so constructed and arranged as to provide a passenger carrying robot having a space inside its head contiguous with a space inside its torso suitable for occupancy by passengers, and so proportioned that said passengers can occupy the space at the conjunction of the head and torso with sufficient freedom to turn about in the act of waving and shouting to onlookers, although the robot is provided with a compact torso and is scaled such that they must occupy both the head and torso simultaneously;

the combination so constructed and arranged that said foot members are restricted by said means to treading in-place on said surface portion, and the lifting and lowering movements of the foot members causes the compartment to vary in elevation above said platform in a manner suitable to displace occupants of the compartment for their merriment.

6. In combination with the product of claim 5: said last mentioned means providing said compartment with a limited degree of freedom to lean from side to side as a result of the lifting and lowering of said foot members, sufficient to impart a rolling displacement to said compartment and create the illusion that the robot is shifting its weight while walking, but not enough to permit the robot to fall on its side.

References Cited in the file of this patent

UNITED STATES PATENTS

| | | |
|---|---|---|
| 1,803,397 | Rizza | May 5, 1931 |
| 1,880,138 | Hubl | Sept. 27, 1932 |
| 2,036,427 | Meler | Apr. 7, 1936 |